April 28, 1953  L. C. KRAUSE  2,636,278
COMPARATOR HAVING MAGNETICALLY COUPLED INDICATOR
Filed March 30, 1948

Inventor:
Leo C. Krause,
by Vernet C. Kauffman
His Attorney

Patented Apr. 28, 1953

2,636,278

UNITED STATES PATENT OFFICE 2,636,278

COMPARATOR HAVING MAGNETICALLY COUPLED INDICATOR

Leo C. Krause, Cleveland, Ohio, assignor to General Electric Company, a corporation of New York Application March 30, 1948, Serial No. 17,830

6 Claims. (Cl. 33—147)

1

My invention relates in general to gauging apparatus for measuring the diameter and circular trueness of cylindrical or tubular articles, particularly those of thin-walled character such as the shells of electric lamp bases, for instance.

To obtain accurate or true gauge readings of the diameter and circular trueness or out-of-roundness of thin-walled cylindrical articles, such as the metal shells of electric lamp bases, it is necessary that the gauge exert as little pressure as possible against the walls of the article in order to assure the absolute minimum possible compression or out-of-round distortion of the article. Where the gauge embraces a conventional type of dial indicator or dial micrometer, such as is commercially available at present, even the slight additional pressure exerted on the test specimen by the conventional helical pull-back spring of the dial indicator acting on the actuating spindle or gauge contact thereof, is apt to distort thin-walled articles slightly out-of-round and thus give untrue readings of the diameter and circular trueness of the article.

It is an object of my invention, therefore, to provide an improved out-of-round gauge of the dial indicator type which will give true readings of the diameter and circular trueness of cylindrical articles and particularly tubular articles of thin-walled character which are easily distorted into out-of-round shape.

Another object of my invention is to provide an out-of-round gauge of the above character which will exert a minimum compressive force against the walls of the test specimen and which will provide true and accurate readings of the circular trueness of the specimen.

Figure 1:
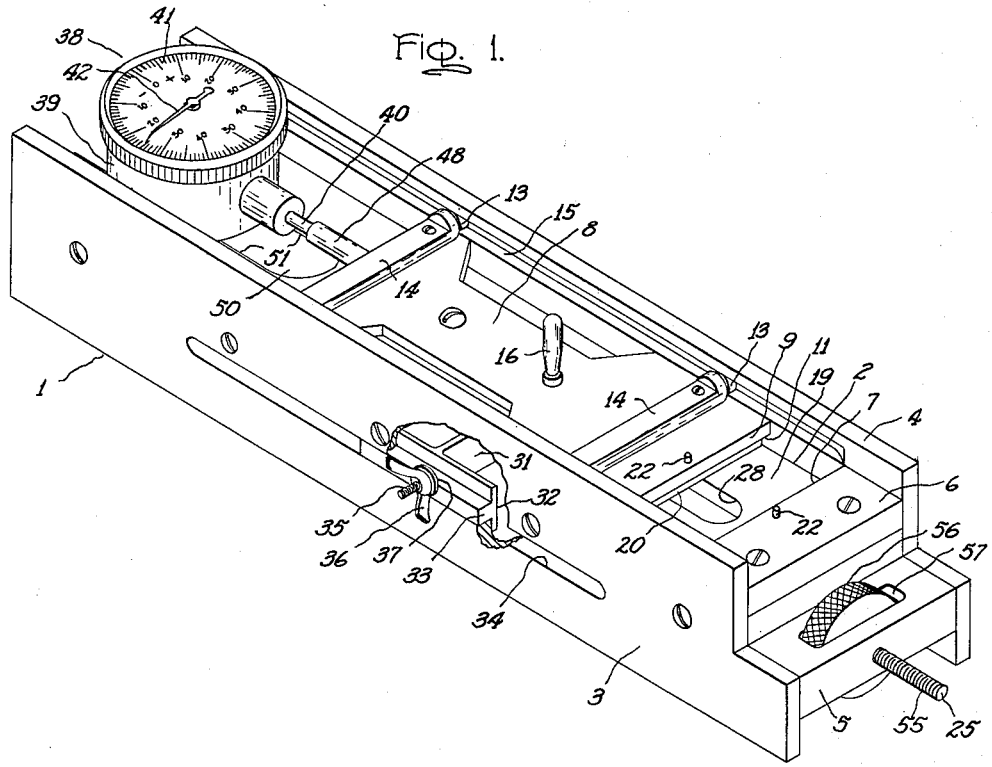
Figure 2:
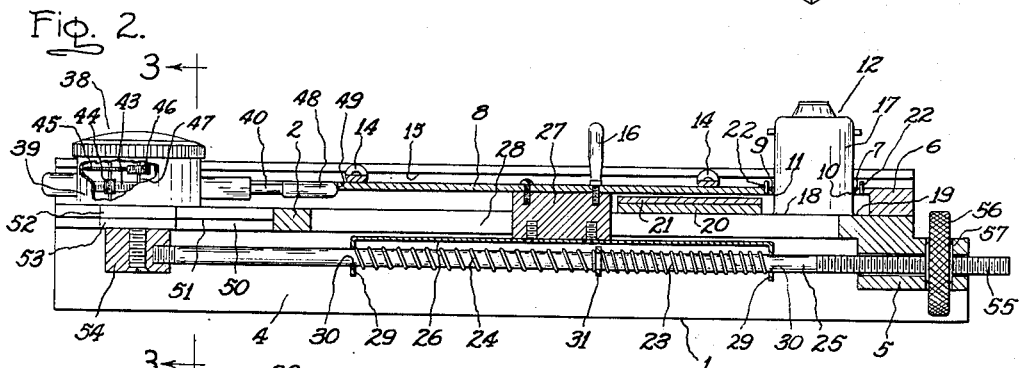
Figure 3:
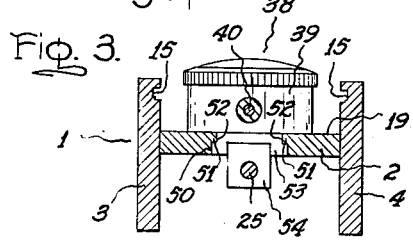

Further objects and advantages of my invention will appear from the following description of a species thereof and from the accompanying drawings in which:

Fig. 1 is a perspective view, partly broken away, of a gauge apparatus comprising my invention;
Fig. 2 is a longitudinal vertical section of the apparatus, and Fig. 3 is a transverse section on the line 3—3 of Fig. 2.

Referring to the drawings, the gauging apparatus according to the invention comprises a metal housing or frame 1 consisting of an elongated bed plate 2 joining a pair of side plates 3, 4 intermediate their upper and lower edges. At the forward end of the housing 1 the bed plate 2 is formed with a bearing block portion 5 to the upper side of which is fastened an anvil plate 6 provided with a rearwardly facing straight edge

2 surface 7 extending transversely of the housing and forming the stationary or anvil contact of the gauge.

Slidably mounted on the housing 1 above the bed plate 2 for reciprocating movement longitudinally of the housing is a plate-shaped follower slide or rider 8 of steel or other suitable magnetic material, and provided with a forwardly facing straight edge surface 9 which extends parallel to and faces the stationary contact 7 and forms the movable contact of the gauge. As shown in Fig. 2, the facing edge surfaces 7 and 9 of the anvil plate 6 and slide 8 are beveled or tapered to diverge upwardly away from each other and provide straight knife edges 10 and 11 adapted to engage the test specimen 12. To assure maximum sensitivity and fidelity for the gauge, an anti-friction slide mounting is provided for the follower slide comprising a plurality (four in the particular case shown) of small support roller bearings 13 which are carried on studs 14 projecting from the sides of the slide 8 and which ride in elongated raceways or grooves 15 formed in the inner sides of the housing side walls 3, 4 and extending longitudinally thereof. An upstanding finger grip pin 16 is provided on the slide 8 for enabling convenient manual sliding movement thereof.

The test specimen 12 to be gauged (in the particular case illustrated the shell portion 17 of an electric lamp base) is inserted and rotated between the stationary and movable straight edge contacts 10 and 11 of the gauge, with its rim end 18 resting on the upper surface 19 of the bed plate 2, as shown in Fig. 2. To enable gauging of the cylindrical test specimen 12 at various distances inwardly from its rim end 18, the anvil plate 6 and slide 8 are spaced upwardly from the upper or rest surface 19 of the bed plate 2, and one or more shim plates 20, 21 are inserted between the bed plate and the slide, the said shim plates being reversible and slidable on the bed plate forwardly into and rearwardly out of specimen-supporting position. In the particular case illustrated, the lower shim plate 20 is made of one-eighth inch thickness and the upper plate 21 is made of one-sixteenth inch thickness, while the contact edges 10 and 11 of the anvil plate and the slide are spaced one-sixteenth inch above the uppermost shim plate 21, thus permitting gauge measurements of the test specimen at distances of one-quarter inch, three-sixteenth inch, one-eighth inch and one-sixteenth inch inwardly from its rim end 18. To permit the gauging of the inside diameter of tubular articles, the anvil plate 6 and the slide 8 are provided with small upstanding pins 22, 22 adjacent their facing edge surfaces 7 and 9, over which pins the open end of the tubular article is positioned and rotated while the pins are held against the inside wall of the article.

The follower slide or rider 8 is resiliently held against the test specimen 12 by one or the other of a pair of compression coil springs 23 and 24, depending on whether the outside or inside diameter of the specimen is to be gauged. The springs 23, 24 are mounted in end-to-end relation on an adjusting rod 25 which extends longitudinally of the gauge beneath the bed plate 2 and is slidably mounted on the gauge housing 1 for sliding movement longitudinally thereof. The pressure of the springs 23, 24 is applied to the follower slide 8 through an inverted U-shaped bracket 26 fastened to the underside of the slide through a spacer block 27 which extends through and moves within an elongated slot 28 in the bed plate 2. The depending arms 29, 29 of the bracket 26 overlie the outer or distal ends of the springs 23, 24 so as to be engageable therewith, and they are provided with apertures 30, 30 through which the adjusting rod 25 extends with a loose fit so as not to interfere in any way with the free and easy sliding movement of the follower slide 8 on the gauge housing 1. An adjustable T-shaped spring stop 31, interposed between and engageable with the facing or adjacent ends of the springs 23, 24 to separate the latter, is slidably mounted on the adjusting rod 25 for adjustment into a set position wherein it compresses one or the other of the springs, depending on whether the follower slide 8 is to be urged forwardly to gauge the outside diameter of the test specimen or rearwardly to gauge the inside diameter of the specimen. To set or fix the spring stop 31 in adjusted position, it is provided with a rider or shoe portion 32 having a tongue 33 which rides in a longitudinally extending slot 34 in the housing side wall 3 and which is formed with an outwardly projecting threaded stud 35 on which is screwed a position-locking wing nut 36, with a washer 37 interposed between the nut 36 and the outer side of the housing side wall 3. Tightening of the locking nut 36 on the stud 35 clamps the shoe portion 32 of the spring stop 31 against the inner side of the housing side wall 3, thereby locking the spring stop 31 in its adjusted position on the rod 25.

The movement of the follower slide 8 in accordance with the variations in the diameter of the test specimen 12, as the latter is rotated between the gauge contacts 10 and 11, is recorded on a dial-type indicator or micrometer 38 which is slidably mounted on the bed plate 2 of the gauge housing 1 at the rear end thereof. The dial indicator 38 is of a standard commercial type, such as manufactured by the Federal Products Corporation of Providence, Rhode Island, for instance, and comprises a housing 39, an actuating spindle 40 projecting from and reciprocable inwardly and outwardly of the housing 39, a dial 41 provided with suitable scale markings on the face thereof, a pointer needle 42 pivotably mounted on the housing 39 to swing around the face of the dial 41, and means within the housing 39 comprising a rack 43 on the spindle 40 and a co-operating train of intermeshing gears 44, 45 and 46 for translating the reciprocating movement of the indicator spindle 40 into rotational movement of the indicator needle shaft 47 to thereby swing the indicator needle 42 around the dial 41. Such commercial type dial indicators are also usually provided with a pull-back tension coil spring (not shown) which normally maintains the indicator spindle 40 in its outermost position. In accordance with the invention, however, the dial indicator 38 actually employed is not provided with any such spindle pull-back spring, as a result of which the spindle 40 is free to float between its inner and outer limiting positions. Instead of being provided with such a pull-back spring, the dial indicator 38 according to the invention is provided with a suitable permanent magnet 48 on the outer end of the spindle 40 which magnet, by reason of its magnetic force of attraction for the steel follower slide 8, will continuously remain in contact with and accurately follow the sliding movement of the said slide 8. By the use of the magnet 48 instead of the conventional pull-back spring, the pressure exerted on the test specimen 12 by the follower slide 8 is therefore kept to a minimum, whereby the possibility of out-of-round distortion of the specimen is minimized. Also, a more uniform gauge contact pressure is exerted on the test specimen since the pressure of the springs 23, 24, which are much longer than such pull-back springs and are adjustable for gauge contact pressure, does not vary as much as that of such pull-back springs throughout the relatively small range of movement which the follower slide 8 undergoes when gauging the circular trueness of cylindrical articles.

As shown, the dial indicator 38 is mounted on the bed plate 2 with its plunger or actuating spindle 40 projecting forwardly toward the follower slide 8 so as to be engageable with the rear edge 49 thereof. In addition, the dial indicator 38 is adjustable longitudinally of the gauge housing 1 to bring the magnet 48 on the end of spindle 40 into engagement with the rear edge 49 of the follower slide and to set the dial indicator in proper gauging position. For such purpose, the bed plate 2 of the gauge housing 1 is slotted inwardly from its rearmost end to provide a longitudinally extending guideway 50, the ways 51 of which have a sliding fit in parallel grooves 52 formed in the back 53 of the dial indicator housing 39. The adjusting rod 25 is secured at its rear end to a block 54 fastened on the dial indicator back 53, while its forward end is supported in the bearing block 5 and is provided with a screw-threaded portion 55 on which is screwed an adjusting thumb nut or wheel 56. The said adjusting nut 56 is freely rotatable within, but locked against movement longitudinally of the gauge housing 1 by engagement with the walls of a transverse slot 57 formed in the bearing block 5 of the bed plate 2. Rotation of the adjusting nut 56 slides the adjusting rod 25 which, in turn, moves the dial indicator 38 forward or back, depending upon the direction of rotation of the nut 56.

In the use of the gauge according to the invention for measuring the diameter and circular trueness or out-of-roundness of a cylindrical article or test specimen 12, a cylindrical comparator or master plug of a known diameter, which either approximates or corresponds exactly to the diameter which the test specimen 12 is supposed to possess, is rested with one end down on the bed plate 2 or on one or the other of the shim plates 20, 21 and between the gauge contact edges 10, 11 of the anvil 6 and follower slide 8. The slide 8 is then moved forwardly to grip the cylindrical comparator between the contact edges 10, 11, and the spring stop 31 then adjusted so as to compress the spring 23, which then yieldingly presses the slide 8 continuously forward against the side wall of the cylindrical comparator. The dial indicator 38 is next adjusted, by means of the adjusting thumb nut 56, to bring the magnet 48 on the indicator actuating spindle 40 into abutting engagement with the rear edge 49 of the slide 8 and with the spindle 40 depressed a slight distance from its outermost limiting position to bring the dial needle 42 into a definitely predetermined position on the face of the dial 41 (usually zero scale reading) and further to position the spindle 40 so as to be free to move both forwardly and rearwardly to a limited extent to thereby follow the movement of the follower slide 8 in response to any possible variations in the diameter of the test specimen 12 which is to be subsequently gauged. With the gauge thus adjusted for gauging measurements, the test specimen 12 is then substituted for the cylindrical comparator or master plug and rotated between the contact edges 10, 11, whereupon its outside diameter in its various rotational positions will be indicated by the pointer needle 42 of the dial indicator and at the same time an indication provided of its circular trueness.

Gauging of the inside diameter of tubular articles or test specimens is accomplished in a similar manner, except that the open end of the article is placed over the upstanding pins 22 on the anvil plate 6 and slide 8 and the spring stop 31 is adjusted so as to compress the rearmost spring 24 to cause it to continuously urge the slide 8 rearwardly and thus maintain the pins 22 in continuous contact with the inside wall of the test specimen.

Where the gauging device is to be used to gauge an article or test specimen which is of a magnetic material in itself, instead of non-magnetic articles such as the brass electric lamp base shells 17, the reciprocating slide 8 may in such case be dispensed with and the magnet-carrying indicator spindle 40 itself employed as the movable contact of the gauge to directly engage the test specimen.

What I claim as new and desire to secure by Letters Patent of the United States is:

1. A gauge for measuring the circular trueness of cylindrical articles comprising a frame, a stationary gauge contact on said frame, a dial indicator mounted on said frame and having a projecting reciprocable actuating spindle floating between inner and outer limiting positions, said dial indicator being mounted on said frame with its said spindle reciprocable toward and away from the said stationary gauge contact, and movable gauge means in opposed relation to said stationary gauge contact to receive therebetween an article to be gauged, said movable gauge means comprising a permanent magnet mounted on and secured to said spindle so as to be unitary therewith.

2. A gauge for measuring the circular trueness of cylindrical articles comprising a frame, a stationary gauge contact on said frame, a movable gauge contact formed at least in part of magnetic material and slidably mounted on said frame in opposed relation to said stationary contact for movement toward and away therefrom, resilient means co-acting with said movable contact to press it against the article positioned between said contacts, a dial indicator mounted on said frame and having a projecting reciprocable actuating spindle floating between inner and outer limiting positions and engageable at its outer end with a magnetic portion of said movable contact for reciprocating movement thereby, and a permanent magnet mounted on and secured to the outer end of said spindle so as to be unitary therewith for holding the said spindle end continuously against the movable contact through the magnetic force of attraction therebetween.

3. A gauge for measuring the circular trueness of cylindrical articles comprising a frame having a straight edge providing a stationary gauge contact, a follower slide formed at least in part of magnetic material and reciprocable on said frame toward and away from the said straight edge contact, said slide having a straight edge opposed to extending parallel to said stationary straight edge contact, a compression coil spring co-acting with said slide to urge it toward the said stationary straight edge contact, a dial indicator mounted on said frame and having a projecting reciprocable actuating spindle floating between inner and outer limiting positions and engageable at its outer end with a magnetic portion of said slide for reciprocating movement thereby, and a permanent magnet mounted on and secured to the outer end of said spindle so as to be unitary therewith for holding the said spindle end continuously against the said slide through the magnetic force of attraction therebetween.

4. A gauge for measuring the outside and inside diameter of tubular cylindrical articles comprising a frame having a straight edge providing a stationary gauge contact, a follower slide formed at least in part of magnetic material and reciprocable on said frame toward and away from the said straight edge contact, said slide having a straight edge opposed to and extending parallel to said stationary straight edge contact, a pair of upstanding pins respectively on said frame and said slide and located adjacent the said straight edges thereon, a pair of compression coil springs selectively co-operative with said slide to respectively urge it toward and away from said stationary straight edge contact, a dial indicator mounted on said frame and having a projecting reciprocable actuating spindle floating between inner and outer limiting positions and engageable at its outer end with a magnetic portion of said slide for reciprocating movement thereby, and a permanent magnet mounted on and secured to the outer end of said spindle so as to be unitary therewith for holding the said spindle and continuously against the said slide through the magnetic force of attraction therebetween.

5. A gauge for measuring the circular trueness of cylindrical articles comprising an elongated frame, a stationary gauge contact on said frame, a movable gauge contact formed at least in part of magnetic material and slidably mounted on said frame in opposed relation to said stationary contact for reciprocating movement longitudinally of the frame toward and away from said stationary contact, a coil spring co-acting with said movable contact to press it against the article positioned between said contacts, spring energizing means adjustable on said frame to energize said spring means, a dial indicator mounted on said frame and having a projecting reciprocable actuating spindle floating between inner and outer limiting positions and engageable at its outer end with a magnetic portion of said movable contact for reciprocating movement thereby, an adjustment rod on said frame connected to said dial indicator for adjusting it longitudinally of the frame to engage the said spindle end with said movable contact, said rod extending through and supporting said coil spring, and a permanent magnet mounted on and secured to the outer end of said spindle so as to be unitary therewith for continuously holding said spindle end in engagement with said movable contact through the magnetic force of attraction therebetween.

6. A dial indicator comprising a housing, a dial mounted on said housing and provided with scale markings on its face, a pointer needle pivotally mounted on said housing to swing across the face of said dial, a spindle reciprocably mounted on and projecting from said housing and operatively connected to said pointer to swing it in response to reciprocating movement of the spindle, said spindle floating between inner and outer limiting positions, and a permanent magnet mounted on and secured to the outer end of said spindle so as to be unitary therewith.

LEO C. KRAUSE.

References Cited in the file of this patent

UNITED STATES PATENTS

| Number | Name | Date |
|--------|------|------|
| 804,067 | Stowe | Nov. 7, 1905 |
| 1,210,557 | Stanberry | Jan. 2, 1917 |
| 1,485,365 | Bradbury | Mar. 4, 1924 |
| 1,634,156 | McCommon | June 28, 1927 |
| 1,779,477 | Langston | Oct. 28, 1930 |
| 1,937,936 | Aldeborgh et al. | Dec. 5, 1933 |
| 2,093,066 | Ames | Sept. 14, 1937 |
| 2,190,961 | Webber | Feb. 20, 1940 |
| 2,197,198 | Street | Apr. 16, 1940 |
| 2,258,760 | Hecker | Oct. 14, 1941 |
| 2,275,036 | Schwartz | Mar. 3, 1942 |
| 2,412,421 | Polk et al. | Dec. 10, 1946 |

FOREIGN PATENTS

| Number | Country | Date |
|--------|---------|------|
| 483,605 | Germany | Oct. 3, 1929 |